United States Patent
Hamza et al.

(10) Patent No.: US 9,172,299 B2
(45) Date of Patent: Oct. 27, 2015

(54) DIGITAL EMI FILTER

(75) Inventors: Djilali Hamza, Kingston (CA); Praveen K. Jain, Kingston (CA)

(73) Assignee: SPARQ Systems Inc., Kingston (CA)

(*) Notice: Subject to any disclaimer, the term of this patent is extended or adjusted under 35 U.S.C. 154(b) by 264 days.

(21) Appl. No.: 14/112,708

(22) PCT Filed: Apr. 19, 2012

(86) PCT No.: PCT/CA2012/000374
§ 371 (c)(1),
(2), (4) Date: Nov. 14, 2013

(87) PCT Pub. No.: WO2012/142703
PCT Pub. Date: Oct. 26, 2012

(65) Prior Publication Data
US 2014/0063872 A1 Mar. 6, 2014

Related U.S. Application Data

(60) Provisional application No. 61/476,959, filed on Apr. 19, 2011.

(51) Int. Cl.
*H02M 1/12* (2006.01)
*H02M 1/44* (2007.01)

(52) U.S. Cl.
CPC .. *H02M 1/44* (2013.01); *H02M 1/12* (2013.01)

(58) Field of Classification Search
CPC ............ H02M 1/12; H02M 1/14; H02M 1/15
USPC ................................. 363/39, 40, 44, 47, 48
See application file for complete search history.

(56) References Cited

U.S. PATENT DOCUMENTS

| 2014/0063872 A1* | 3/2014 | Hamza | H02M 1/44 363/39 |
| 2015/0029760 A1* | 1/2015 | Karlsson | H02M 1/08 363/17 |

OTHER PUBLICATIONS

International Search Report for International Application No. PCT/CA2012/000374 dated Jul. 26, 2012.
Written Opinion for International Application No. PCT/CA2012/000374 dated Jul. 26, 2012.
Balcells, J, at al., "EMI Reduction in Switched Power Converters using Frequency Modulation Techniques", IEEE Transactions on Electromagnetic Compatability, vol. 47, No. 3, pp. 569-576, (2005).
Berman, M., "All about EMI Filters", Electronics Products, pp. 51-53. (2008).

(Continued)

*Primary Examiner* — Jeffrey Sterrett
(74) *Attorney, Agent, or Firm* — Stephen J. Scribner

(57) ABSTRACT

The invention provides a digital active EMI filter that removes, minimizes, or reduces unwanted interference (i.e., EMI noise) generated by a power circuit such as, for example, a power converter. Digital active filtering includes digital sampling of the incident noise signal amplitude and frequency, discrete time conversion of the EMI noise source, processing (e.g., inverting) the digital signal, and then constructing an analog output signal (i.e., an EMI compensation signal) which is injected to the input of the power circuit. A digital EMI filter as described herein may be used in both differential-mode and common-mode configurations, and overcomes limitations of passive and active analog EMI filters.

22 Claims, 20 Drawing Sheets

(56) References Cited

OTHER PUBLICATIONS

Chung, H., et al., "Reduction of Power Converter EMI Emission Using Soft-Switching Technique", IEEE Transactions on Electronmagnetic Compatability, vol. 40, No. 3, pp. 282-287,(1998).

Dousoky, G.M. et al., "On Factors Affecting EMI-Performance of Conducted-Noise-Mitigating Digital Controllers in DC-DC Converters—An Experimental Investigation", ECCE, IEEE, pp. 1239-1245, (2010).

Guo, T. et al., "Separation of the Common-Mode- and Differential-Mode-Conducted EMI Noise", IEEE Transactions on Power Electronics, vol. 11, No. 3, pp. 480-488, (1996).

Hamza, D. et al., "Conducted EMI Noise Mitigation in DC-DC Converters using Active Filtering Method", PESC, IEEE, pp. 188-194, (2008).

Hamza, D., et al., "Electromagnetic Interference Mitigation in Switched Mode Power Converters Using Digital Sampling Techniques", Thesis submitted to Graduate Program, Queen's University, (2011).

Lee, D.Y. et al., "Design of an Input Filter for Power Factor Correction (PFC) AC to DC Converters Employing and Active Ripple Cancellation", Proceedings of the 31st ECEC Conference, IEEE, pp. 582-586, (1996).

Miyashita, J. et al., "Measurement of the Source Impedance of Conducted Emission Using Mode Separable LISN: Conducted Emission of a Switching Power Supply", Electrical Engineering in Japan, vol. 139, No. 2, pp. 72-78, (2002).

Podbersic, M., et al., "An EMI Filter Selection Method Based on Spectrum of Digital Periodic Signals", Sensors, 6, pp. 90-99, (2006).

Trescases, O., et al., "An EMI Reduction Techniques for Digitally Controlled SMPS", IEEE Transactions on Power Electronics, vol. 22, No. 4, pp. 1560-1565, (2007).

Ye, S., et al., "A Novel EMI Filter Design Method for Switching Power Supplies", IEEE Transactions on Power Electronics, vol. 19, No. 6, pp. 1668-1678, (2004).

Zhang, D., "An Experimenntal Comparison of Conducted EMI Emissions between a Zero-Voltage Transition Circuit and a Hard Switching Circuit", PESC, IEEE, pp. 1992-1997, (1996).

\* cited by examiner

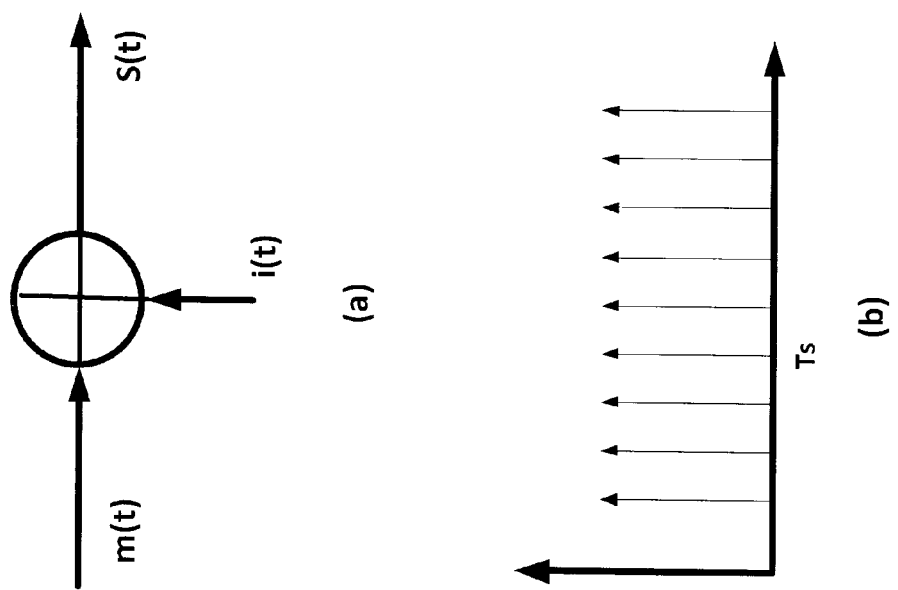

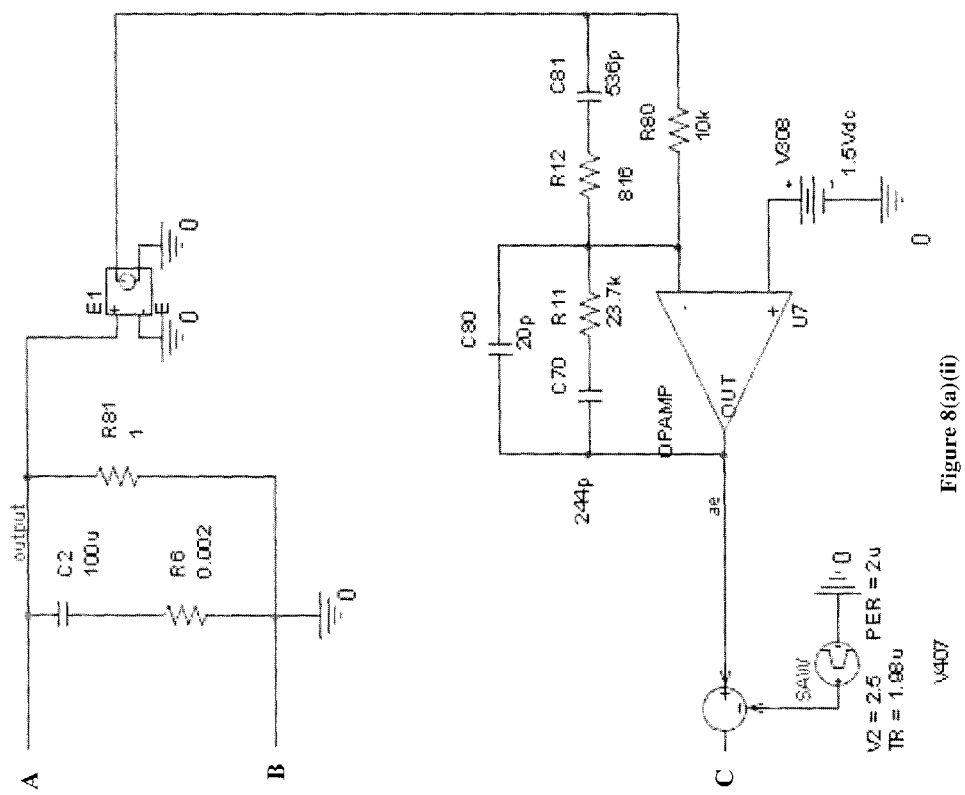
Figure 8(a)(ii)

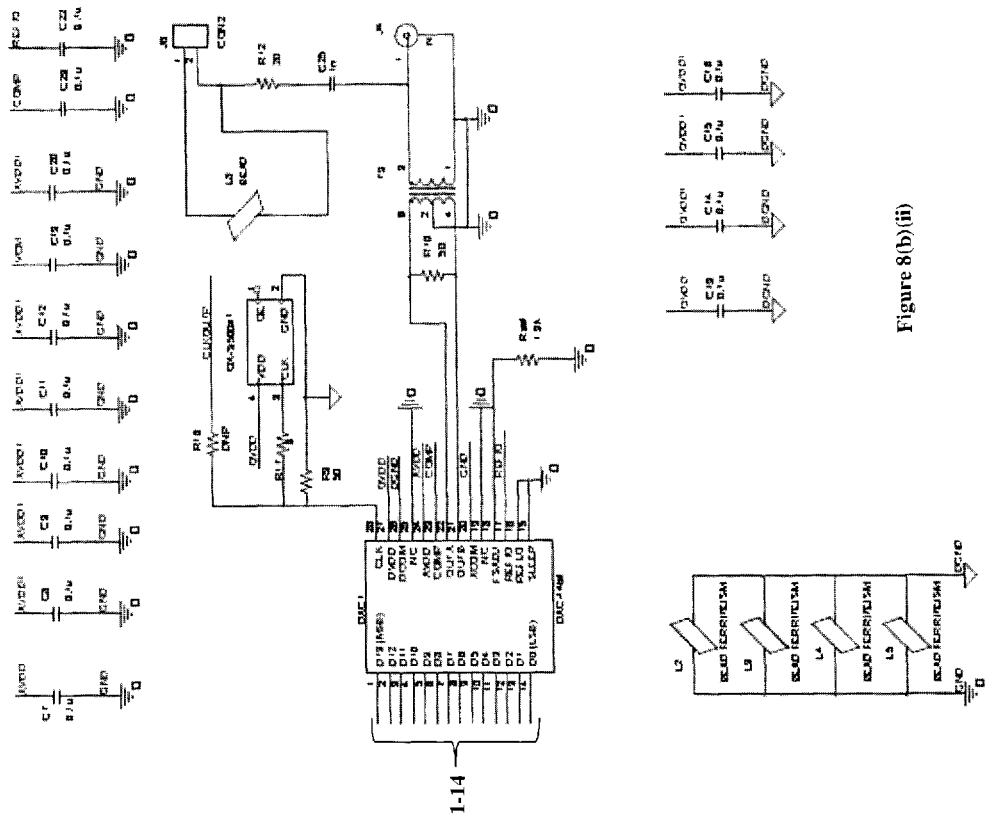
Figure 8(b)(ii)

DIGITAL EMI FILTER

FIELD

This invention relates to noise suppression for power circuits. In particular, this invention provides digital active EMI filters for power converters.

BACKGROUND

Switching waveforms of power converters generate electromagnetic interference (EMI) at the fundamental switching frequency and its harmonics. The EMI (i.e., noise) is transmitted in two forms: radiated and conducted. Usually conducted noise is several orders of magnitude higher than the radiated noise in free space. The conducted noise consists of two categories commonly known as the differential mode and the common mode. The differential-mode noise is a current or voltage noise measured between the lines of the source. The common-mode noise is a current or voltage noise measured between the power lines and the ground. Both differential-mode and common-mode noises are taken into account in EMI filter design, with common-mode noise being the dominant factor.

Passive EMI filters employ only passive components and provide a rudimentary level of EMI filtering. Passive filtering technique is simple and cost effective in some applications; however, in applications where stringent noise reduction is required, the size, weight, effect of temperature, and reliability can present a significant design challenge.

Active analog EMI filters use active analog components such as op-amps to reduce EMI noise in circuits such as power converters. This technique samples the noise signal, processes it, and injects it back into the circuit to cancel the incident noise signal. The EMI noise is reduced by superposition of two signals with the same magnitude and opposite phase propagating in the same direction. Such active analog EMI filters provide better noise suppression over passive filters, are low cost, and are generally convenient to implement. At high frequencies the performance of analog active EMI filters is limited by the frequency characteristics of the active device. Hence, such a filter requires additional passive elements to complete the electromagnetic compatibility (EMC) spectrum. At the same time, any negative impedance seen by the power converter, due to passive components of the EMI filter and the filter implementation, can have a negative impact on the power converter stability. In addition, analog filters may be bulky as their size is product-specific and varies with the input parameters of the power converter, such as rated current and voltage.

SUMMARY

Described herein is a method for removing, minimizing, or reducing EMI noise generated by a power circuit, comprising: (i) combining at an input of the power circuit an EMI compensation signal with EMI noise generated by the power circuit to produce a combined signal; and (ii) sampling the combined signal and adjusting the EMI compensation signal; wherein sampling and adjusting comprises: producing a digital noise signal from the combined signal; processing the digital noise signal; and constructing an adjusted EMI compensation signal from the processed digital noise signal; (iii) repeating steps (i) and (ii) wherein combining is performed with the adjusted EMI compensation signal; wherein EMI noise at the input of the power circuit is removed, minimized, or reduced.

Sampling may include using a high pass filter and an analog to digital converter to produce the digital noise signal. Processing may include inverting and providing gain to the digital noise signal. Constructing may include using a digital to analog converter and a low pass filter to produce the EMI compensation signal.

The method may include selecting the high pass filter, gain, and low pass filter to remove, minimize, or reduce EMI noise at the input of the power circuit. The method may include preventing high frequency components of the EMI noise from being sampled or conducted to an input power supply of the power circuit. The method may include using an element having high impedance at high frequency at an input of the power circuit. The element having high impedance at high frequency may be inserted between a sampling node and a node where the EMI compensation signal is combined with EMI noise generated by the power circuit. The method may include selecting a low pass filter transfer function that is complementary to a transfer function of the high impedance element.

In one embodiment, the power circuit is a power converter. In another embodiment, at least one of sampling, processing, and constructing is implemented in a digital signal processor (DSP), a field programmable gate array (FPGA), or an application specific integrated circuit (ASIC).

Also described herein is a digital EMI filter for a power circuit, comprising: means that combines at an input of the power circuit an EMI compensation signal with EMI noise generated by the power circuit to produce a combined signal; and means that samples the combined signal and adjusts the EMI compensation signal by producing a digital noise signal from the combined signal, processing the digital noise signal; and constructing an adjusted EMI compensation signal from the processed digital noise signal; wherein the adjusted EMI compensation signal is subsequently combined with EMI noise generated by the power circuit, such that EMI noise at the input of the power circuit is removed, minimized, or reduced.

The means that samples the combined signal and adjusts the EMI compensation signal may comprise: a high pass filter and an analog to digital converter; a processor; and a low pass filter and a digital to analog converter. The processor may include an inverter that inverts the digital noise signal. The filter may comprise an element having a high impedance at an EMI noise frequency, wherein the element is inserted between a sampling node and a node where the EMI compensation signal is combined with EMI noise generated by the power circuit. The low pass filter may have a transfer function that is complementary to a transfer function of the high impedance element. At least one of the analog to digital converter, processor, and digital to analog converter may be implemented in a DSP, FPGA, or ASIC.

Also described herein is a power circuit, such as a power converter, including a digital active EMI filter.

BRIEF DESCRIPTION OF THE DRAWINGS

For a better understanding of the invention, and to show more clearly how it may be carried into effect, embodiments will be described, by way of example, with reference to the accompanying drawings, wherein:

FIGS. 2(a) and (b) show an embodiment of an impulse sampling model;

DETAILED DESCRIPTION OF EMBODIMENTS

Described herein is a digital active EMI filter that removes, minimizes, or reduces unwanted interference (i.e., EMI noise) generated by a power circuit such as, for example, a power converter. The power converter may be a DC/DC converter or an AC/DC converter, as used in power supplies, e.g., in computer and telecommunications equipment, or in power generation systems such as those associated with photovoltaic panels and wind turbines. Typically the interference noise signal flows from the power circuit input back towards the power distribution system (e.g., the power grid), as the grid typically has a lower impedance than the input impedance of the power circuit. Digital active filtering includes digitally sampling the incident noise signal amplitude and frequency for discrete time conversion of the EMI noise source, processing (e.g., inverting) the digital signal, and then constructing an analog output signal (i.e., an EMI compensation signal) which is injected to the input of the power circuit. A digital EMI filter as described herein may be used in both differential-mode and common-mode configurations, and overcomes the limitations of passive and active analog EMI filters noted above.

Figure 1A:
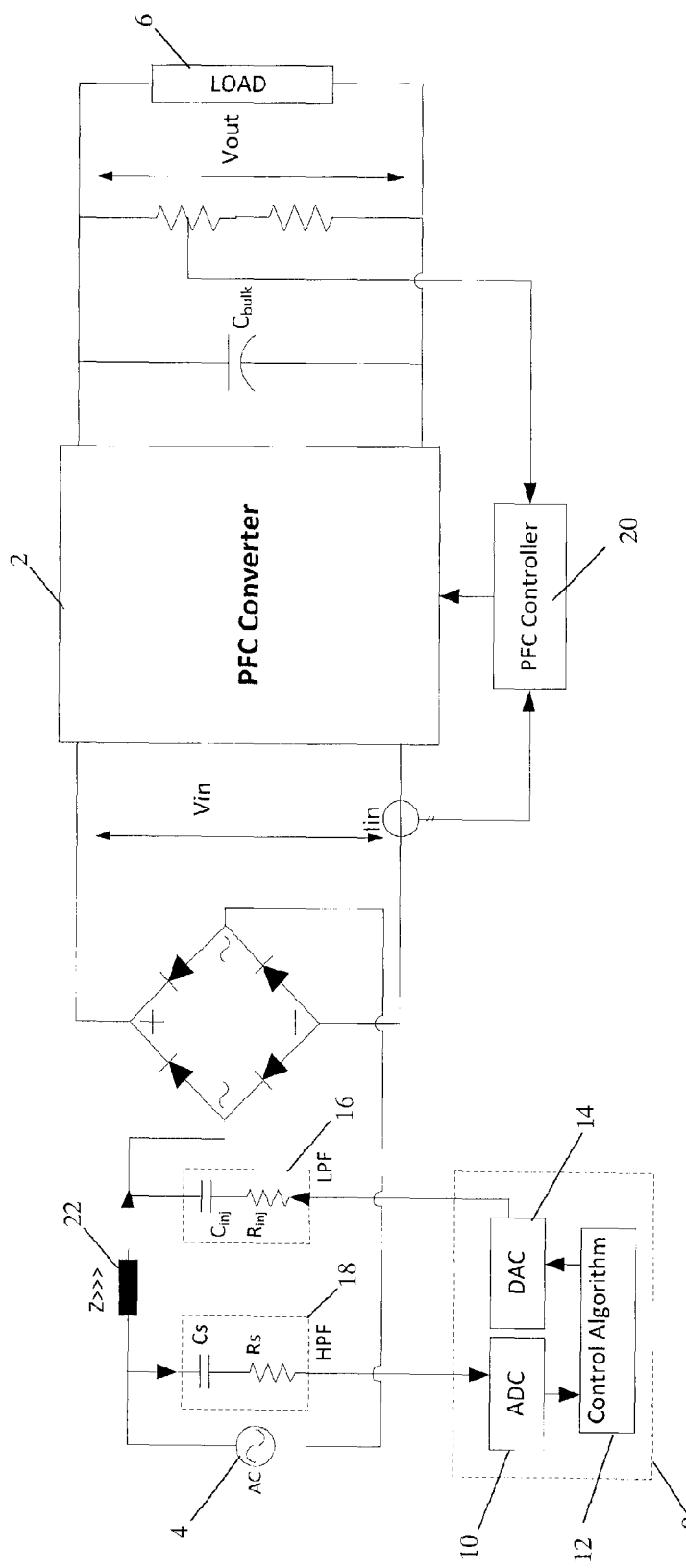
FIGS. 1(a) and 1(b) are generalized schematic diagrams of a digital EMI filter as described herein implemented with a power circuit.

An exemplary circuit of a differential mode implementation is shown in FIG. 1(a). Referring to FIG. 1(a), a power converter stage 2, such as a power factor correction (PFC) converter, conditions power originating from an AC source 4 and outputs the power to a load 6. The power converter may optionally have a power factor correction controller 20. A digital EMI filter as described herein is shown at 8, and includes a high speed analog-to-digital converter (ADC) 10, one or more components 12 that process the digital signal according to an algorithm, a digital to analog converter (DAC) 14, and an output filter 16. The input to the digital EMI filter is the voltage noise that is sensed at a sensing node through an RC high-pass filter 18, including Rs and Cs. Impedance matching may be provided between the high pass filter 18 and the ADC input. The noise voltage is sampled by the ADC, processed (e.g., inverted using a binary inverter), and converted back to an analog signal by the DAC. The constructed EMI compensation signal is fed back to the input of the power converter at an injection node through the low pass filter 16 (e.g., an RC filter). Impedance matching may be provided between the DAC ouput and the low pass filter 16. In some embodiments an injection capacitor $C_{inj}$ is used to prevent the DAC from being loaded by the power converter. One or more of the high-pass filter 18, ADC 10, processor 12, DAC 14, and low pass filter 16 provide gain. For example, gain may be introduced to the digital signal by a multiplication factor implemented by the processor 12. A decoupling element 22 having high impedance at high frequency, such as, for example, a ferrite element, is inserted between the sensing node and the injection node to prevent high frequency components of the EMI compensation signal from feeding back to the filter input.

It will be appreciated that a digital active EMI filter as described herein may be implemented in common mode by, for example, using a circuit 8 with filters 16, 18 for each of the supply lines that provide power to the input of the power circuit 2. In such case the filters are referenced to a common ground (e.g., chassis), whereas differential mode, the filter is referenced to circuit ground. Other variations of the circuit will be apparent to those of ordinary skill in the art. For example, in FIGS. 1(a) and 1(b), the filter could also be implemented on the DC side of the rectifier circuit. The filters 16, 18, may independently be implemented in whole or in part using discrete components, digitally (e.g., in a digital signal processor (DSP), field programmable gate array (FPGA), or application specific integrated circuit (ASIC) device), or a combination thereof.

Figure 1B:
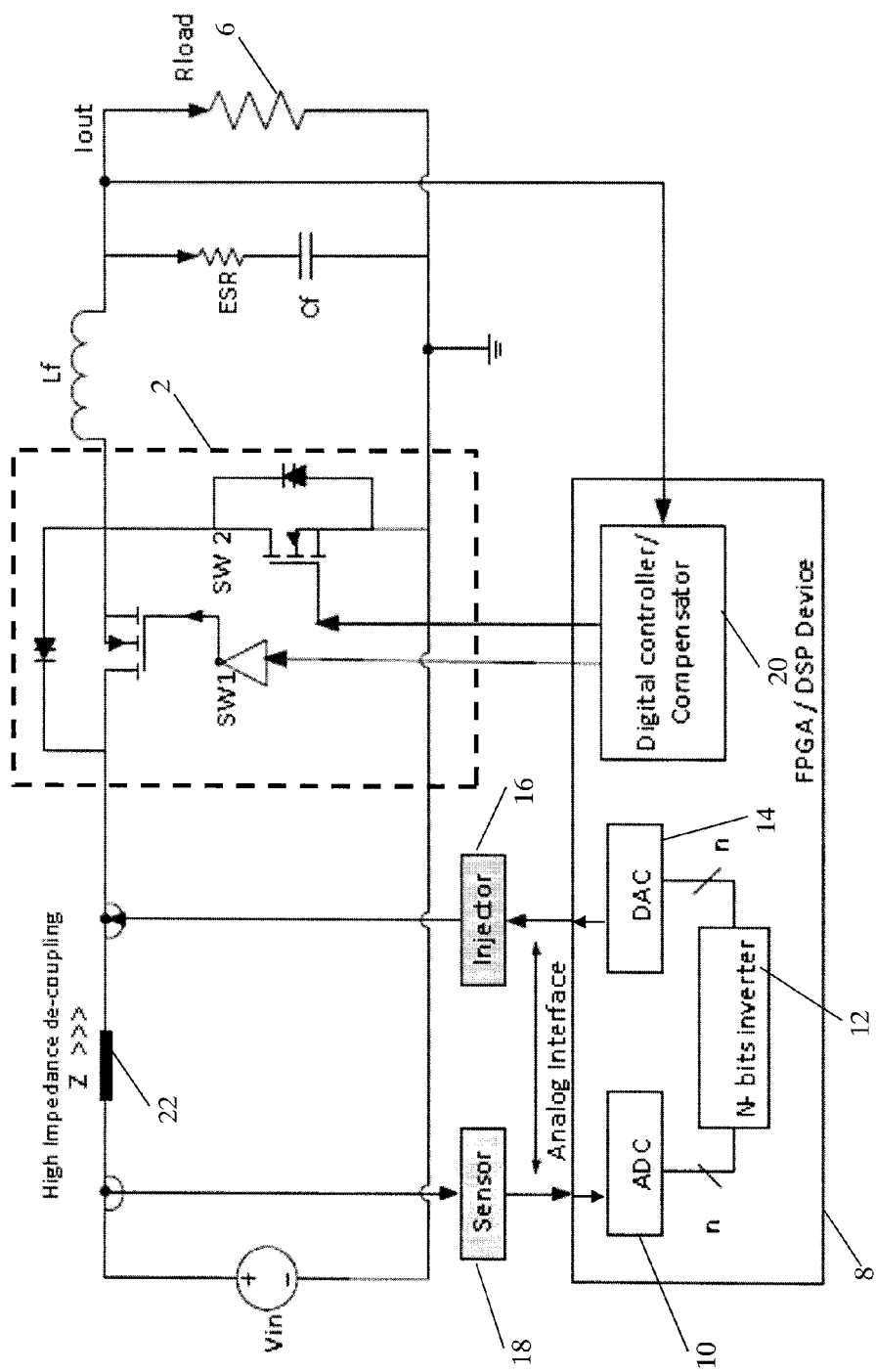
Figure 1C:
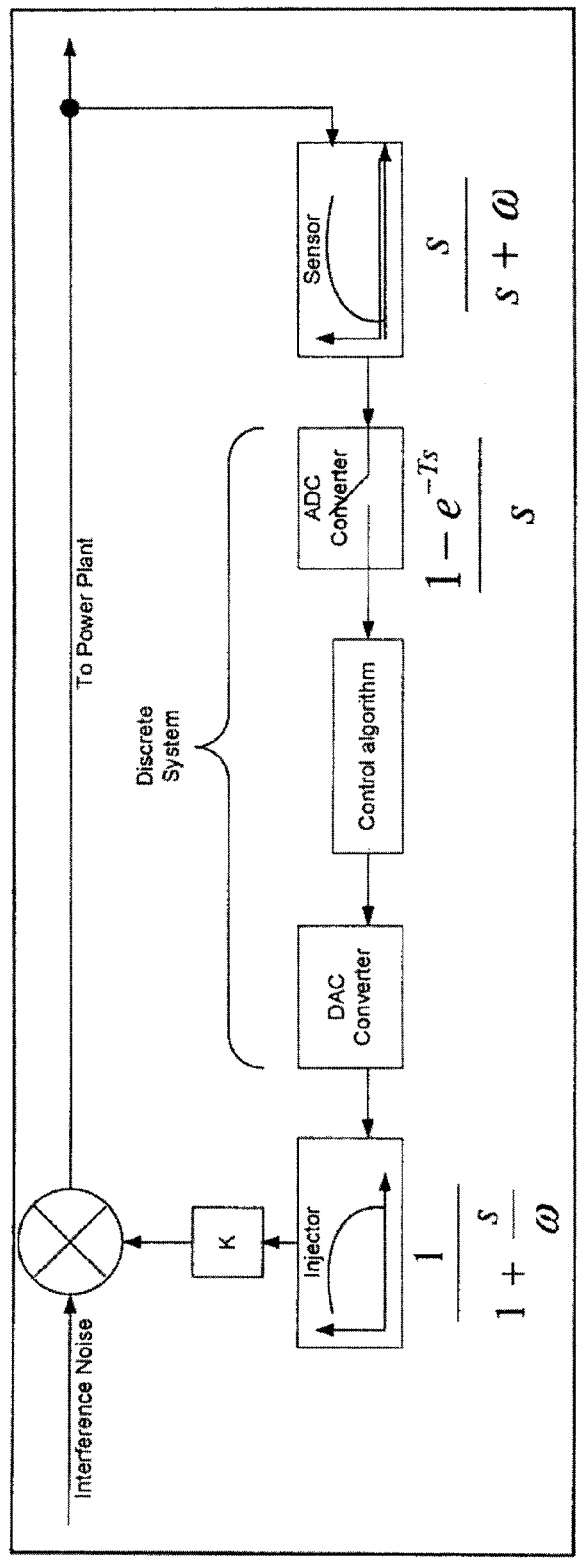
FIGS. 1(c) and 1(d) are block diagrams of digital signal processor-based and field programmable gate array-based digital EMI filters, respectively.

In one embodiment, one or more components of the digital EMI filter 8 is modeled using sequential digital signal processing codes in the discrete domain, as it is not frequency dependent. That is, DSPs are not common in high switching frequency or low cost applications, mainly because of their sequential operation wherein instructions are executed one after the other, which results in a delayed signal. This is proportional to the number of instructions that need to be executed. However, in the case of a digital EMI filter, only a few instructions are needed (e.g., to invert the phase of the sensed noise signal). Hence, the execution time does not have a substantial negative impact on the overall performance of the digital EMI filter (e.g., no phase distortion within the digital block is apparent). However, a delay may be introduced due to the injection of a capacitive element, which in turn may prevent complete nullification of the conducted noise of the converter. In the embodiment shown in FIGS. 1(a) and 1(b), reference numeral 8 refers to components implemented by a DSP, including an ADC 10, one or more components that manipulate the digital signal according to an algorithm 12, and a DAC 14. An example of a digital EMI filter implemented with a DSP or FPGA device with an inverter as the power circuit is shown in FIG. 1(b), where n represents the number of bits used (e.g., 14 bits, but not limited thereto). A block diagram of an exemplary DSP-based digital EMI filter is shown in FIG. 1(c). In one embodiment the algorithm may be provided in C and compiled for execution by the DSP.

Figure 1D:
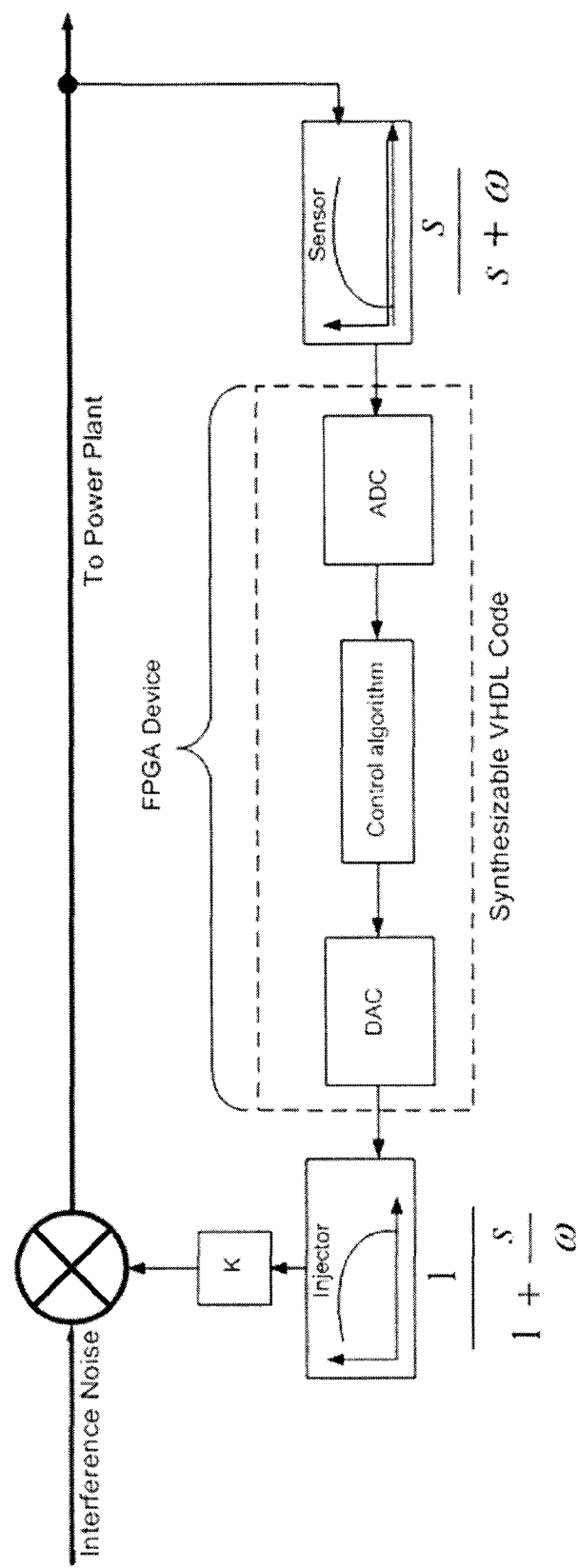

According to another embodiment, one or more components of the digital EMI filter 8 is implemented in an algorithm using a suitable hardware language such as, for example, very high speed integrated circuit (VHSIC) hardware descriptive language (VHDL), register transfer language (RTL), or Verilog. Such an algorithm embodying a digital EMI filter may be implemented in, for example, a FPGA or ASIC device, or other suitable logic device(s). Because of the simultaneous execution of instructions afforded by a FPGA (or equivalent) device, substantially no delay is introduced. According to this embodiment, in the exemplary circuits of FIGS. 1(a) and 1(b), reference numeral 8 refers to components implemented by a FPGA or ASIC, including an ADC 10, one or more components 12 that manipulate the digital signal, and a DAC 14 that outputs an analog signal from the manipulated digital signal. A block diagram of a FPGA-based digital EMI filter embodiment is shown in FIG. 1(d).

Principle of Operation

The principle of operation of a representative embodiment, with a DSP-based digital EMI filter, will now be described with reference to FIG. 1(a). As noted above, the interference noise signal propagates toward the utility grid, via the input rails of the power distribution system. The input parameter to the digital EMI filter is the voltage noise, which is sensed through the RC high-pass filter and sampled using a high speed ADC 10.

During sampling, the continuous analog signal is converted into a discrete time signal or a sequence of numbers. Depending on the characteristics of the sampling circuit, sampling may be modeled differently, resulting in different frequency spectra for the sampled signal. In the embodiments described herein, the impulse sampling technique, also known as instantaneous sampling (see FIGS. 2(a) and (b)), was used, although other sampling techniques may of course be used.

Referring to FIG. 2(a), consider a band-limited low-pass signal m(t). Assume that M(f) is the frequency domain representation of that signal. Sampling of the signal may be achieved by multiplying the continuous input signal by an infinite impulse train 1(t) having a period $T_s$ as shown in FIG. 2(b), where i(t) is given by:

$$i(t) = \sum_{n=-\infty}^{\infty} \delta(t-nT_s) \quad (0.1)$$

The frequency domain transformation of i(t) is also an impulse train given by:

$$I(t) = \frac{1}{T_s} \sum_{n=-\infty}^{\infty} \delta\left(f - \frac{m}{T_s}\right) \quad (0.2)$$

Where:

$$\frac{1}{T_s}$$

is the sampling frequency $f_s$. The sampled signal is given by:

$$S(t) = m(t) \times i(t) \quad (0.3)$$

Substituting (1.1) in (1.3), the expression for the sampled signal is:

$$S(t) = \sum_{n=-\infty}^{\infty} m(nT_s)\delta(t-nT_s) \quad (0.4)$$

Multiplication in the time domain corresponds to convolution in the frequency domain. Hence, the frequency domain transformation of the sampled signal is given by:

$$S(t) = \frac{1}{T_s} \sum_{m=-\infty}^{\infty} M\left(f - \frac{1}{T_s}\right) \quad (0.5)$$

To recover the continuous band-limited signal the sampled signal s(t) is passed through an ideal low-pass filter having a frequency response:

$$H(f) = \begin{cases} T_s & |f| \leq f_m \\ 0 & \text{otherwise} \end{cases} \quad (0.6)$$

Where $f_m$ is the maximum frequency of the band-limited signal.

To restore the continuous band-limited signal m(t) from the sampled signal s(t), the maximum frequency $f_m$ of the band-limited signal must be less than or equal to half the sampling frequency $f_s$, i.e., $$2f_m \leq f_s \quad (0.7)$$

Figure 3:
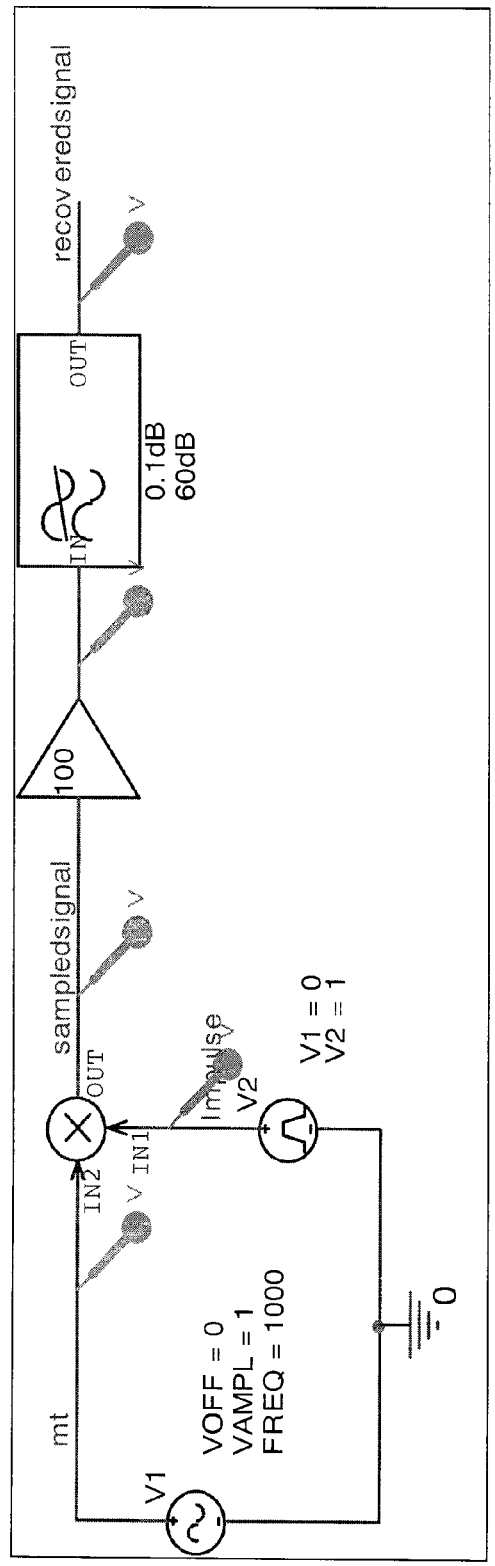
FIG. 3 is a schematic diagram of a circuit for sampling a time-domain analog signal according to one embodiment.
Figure 4:
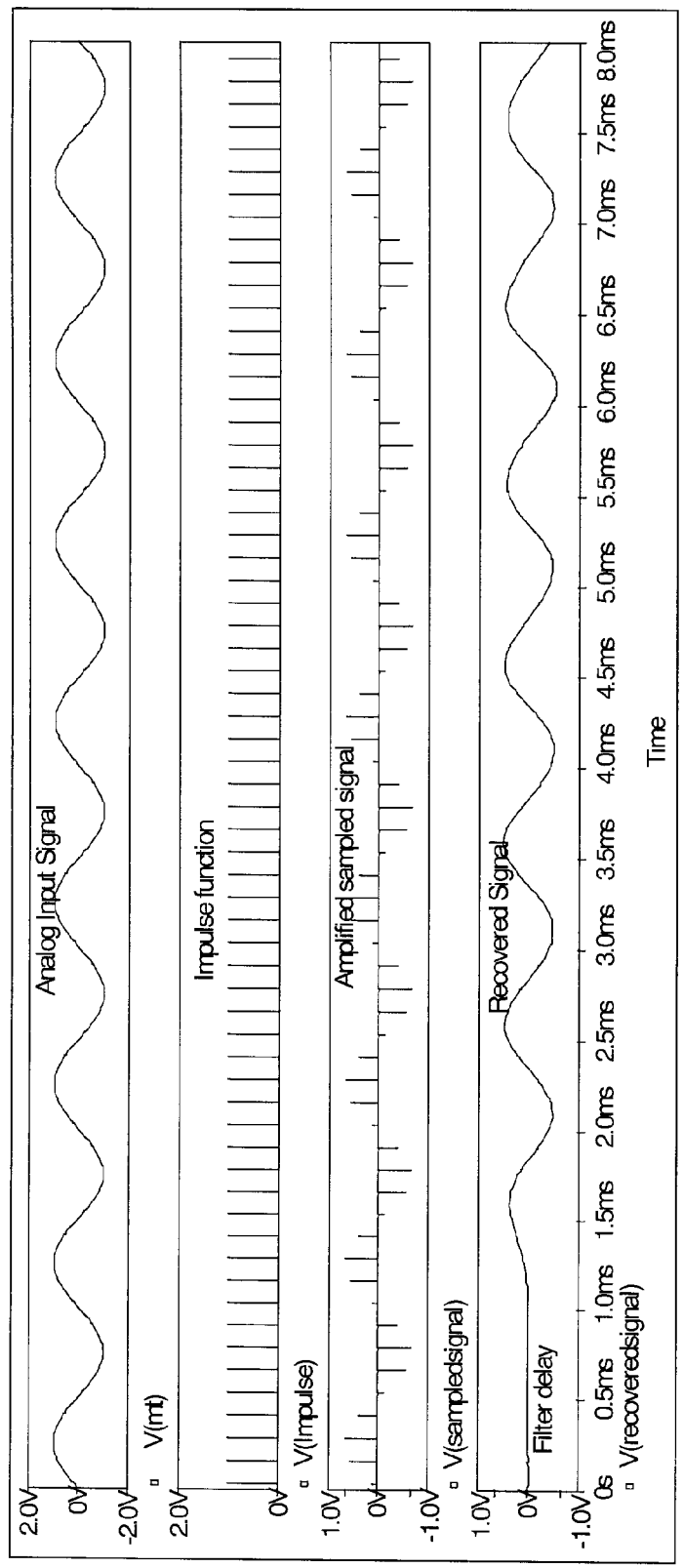
FIG. 4 shows simulation waveforms of the impulse sampling model and the recovered signal.

Inequality (0.7) is known as the Nyquist condition for perfect reconstruction of a band-limited signal. The minimum sampling frequency that satisfies inequality (0.7) is known as the Nyquist rate. If the Nyquist condition of (0.7) is not satisfied, the spectra of the images overlap causing aliasing. When this occurs the signal m(t) cannot be recovered from the sampled signal. FIG. 3 shows a simulation circuit for sampling a time domain signal, with the delay introduced by the low-pass filter.

As noted above, the noise voltage of the power converter is sampled using an ADC. The ADC includes as major components a sample, a quantizer, and a coder. The analog signal is discretized in the time domain by the sampler. Then the quantizer, a many-to-one transformer, performs an approximation to the analog signal by approximating it to one of a finite number of discrete levels. After being quantized, the coder maps each quantized level into a binary code-word.

The DAC includes as a major component a decoder, and, together with the low-pass filter, performs the reverse operations to those of the ADC. The decoder transforms the binary code into a quantized signal level. However, because the quantizer is a many to one transformer, it has no inverse equivalent in the DAC. Thus, any quantization noise added to the signal cannot be removed by the DAC. The low-pass filter converts the time-discrete (sampled) signal into a continuous analog EMI compensation signal. The low-pass filter may be a RC filter and it will be appreciated that the value of C may be selected to optimize performance of the digital EMI filter. For example, overall attenuation of the EMI noise may be optimized for gain flatness across the spectrum, which may include selecting a value of C that provides a pole of the LPF transfer function in such a way to complement the zero introduced by the high impedance element 22 (see FIG. 1(a)).

The input signal to the ADC is the EMI source voltage generated in the power converter, and it is assumed to be a periodic noise signal. The ADC discrete signal output with a specific bit resolution is then subjected to bit inversion processing. The inverted bits are then fed to the DAC to recover the original signal with a 180° phase inversion.

The conversion process of the EMI signal from the input to the output is described by the transfer function of the ADC and the DAC respectively as shown below.

The output function of the ADC, X*(t), is a sampled signal of the input function x(t) in a bit pattern format. The output function of the DAC, Y(t), is a piece-wise linear function of the sampled signal X*(t). The output function of the DAC before the low-pass filter is a piece-wise linear constant or ramp function in the $n^{th}$ period T and may be represented by:

$$y_n(\tau) = A_n\tau + B_n \quad 0 \leq \tau < T \tag{0.8}$$

So that $$y(t) = \sum_{n=-\infty}^{\infty}(A_n\tau + B_n) \tag{0.9}$$

where:

$$A_n = a_1 x[(n-1)T] + a_2 x(nT) \tag{0.10}$$

and $$B_n = b_1 x[(n-1)T] + b_2 x(nT) \tag{0.11}$$

Where $a_{1,2}$ and $b_{1,2}$ are constants determined by the particular sample-and-hold. In the zero-order hold (ZOH) case, the output has a constant value equal to x(nT) throughout the interval $\tau$.

Taking the Laplace transforms of the function Y(t) as follows, $$Y(s) = \mathcal{L}[y(t)] \int_{nT}^{(n+1)T}(A_n\tau + B_n)e^{-st}dt \tag{0.12}$$

Replacing $\tau = t - nT$, the above equation becomes $$Y(s) = \sum_{n=-\infty}^{\infty}\left(A_n e^{-snT}\int_0^T \tau e^{-s\tau}d\tau + B_n e^{-snT}\int_0^T e^{-s\tau}d\tau\right) = \tag{0.13}$$

$$\sum_{n=-\infty}^{\infty}(S_1 A_n + S_2 B_n)e^{-snT}$$

Where:

$$S_1 = \frac{1}{s}(1 - e^{-sT} - sTe^{-sT}) \tag{0.14}$$

and $$S_2 = \frac{1}{s}(1 - e^{-sT}) \tag{0.15}$$

Using the shifting properties of the transform for (0.13), $S_1$ can be determined as $$\sum_{n=-\infty}^{\infty} S_1 A_n e^{-snT} = \tag{0.16}$$

$$S_1 \sum_{n=-\infty}^{\infty}\left\{\begin{array}{c}a_1 x[(n-1)T] + \\ a_1 x(nT)\end{array}\right\}e^{-snT} = X^*(s)S_1(a_1 e^{-sT} + a_2)$$

Similarly, for $S_2$:

$$\sum_{n=-\infty}^{\infty} S_2 B_n e^{-snT} = S^*(s)S_2(b_1 e^{-sT} + b_2) \tag{0.17}$$

Substituting (0.16), (0.17), (0.14), and (0.15) into (0.13) the general transfer function is $$\frac{Y(s)}{X^*(s)} = \tag{0.18}$$

$$\frac{1}{s^2}(a_1 e^{-sT} + a_2)(1 - e^{-sT} - sTe^{-sT}) + \frac{1}{s}(b_1 e^{-sT} + b_2)(1 - e^{-sT})$$

For a ZOH based DAC, the time function Y(t) is constant for a period T. That is, $$y(t) = x(nT), \text{ For } nT \leq t < (n+1)T \quad 0.19$$

Thus, comparing (0.19) with (0.8) yields $a_1 = a_2 = b_1 = 0$ and $b_2 = 1$. Substituting these values into (0.18), the general transfer function for a ZOH-based DAC may be simplified as follows.

$$\frac{Y(s)}{X^*(s)} = \frac{1 - e^{-sT}}{s} \tag{0.20}$$

The relation between the sensed analog signal x(t) to the sampled signal variable x*(t) in the S-domain is $$X^*(s) = \frac{1}{T}\sum_{n=-\infty}^{\infty} X\left(s - j\frac{n2\pi}{T}\right) \tag{0.21}$$

The input-to-output transfer function for the ZOH DAC may then be written $$\frac{Y(s)}{X(s)} = \frac{1 - e^{-sT}}{sT}\sum_{n=-\infty}^{\infty} X\left(s - j\frac{n2\pi}{T}\right) \tag{0.22}$$

While the transfer function from Input x(t) to Output y(t) is complicated by the repeating spectrum, the effective frequency response is the continuous Laplace transform transfer function of the impulse response which can be expressed as.

$$G_{zoh}(s) = \frac{1}{T}\frac{Y(s)}{X^*(s)} = \frac{1 - e^{-Ts}}{sT} \tag{0.23}$$

Thus, by substituting $s = j\omega$, in (0.23), the magnitude and phase of the transfer function in frequency domain can be obtained.

$$G_{zoh}(j\omega) = \frac{1}{T}\frac{Y(j\omega)}{X^*(j\omega)} = \frac{1 - e^{-Tj\omega}}{j\omega T} = T \cdot e^{-\frac{j\omega T}{2}}\mathrm{sinc}(\omega T/2\pi) \tag{0.24}$$

Where $\mathrm{sinc}(\omega T)$ is the normalized sinc function equal to $$\frac{\sin(\omega T/2)}{\omega T/2}$$

The gain is:

$$|G_{zoh}(j\omega)| = \frac{2 \cdot T}{\omega T}\left|\sin\frac{\omega T}{2}\right| \tag{0.25}$$

The phase is:

$$\angle G_{zoh}(j\omega) = -\frac{\omega T}{2} \tag{0.26}$$

Thus the effect of the ZOH on the feedback loop is to introduce a phase shift of $$\frac{\omega T}{2}$$

and to increase the gain by a magnitude of $$\sin\frac{\omega T}{2}.$$

Analysis and Design Approach

Figure 5:
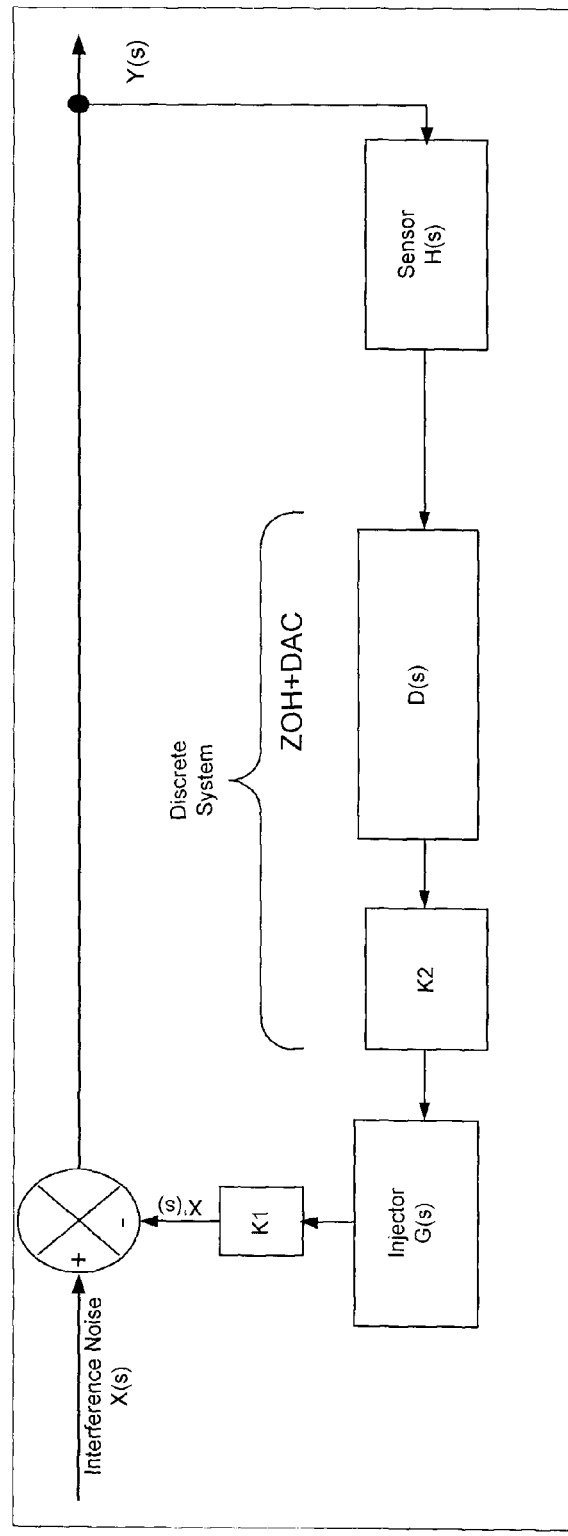
FIG. 5 is a feedback block diagram of a digital EMI filter according to one embodiment.

The feedback system diagram of the DSP-based EMI filter is illustrated in FIG. 5. The closed loop system transfer function can be written as $$\frac{Y(s)}{X(s)} = \frac{1}{1 + K_1 K_2 H(s) D(s) G(s)} \quad (0.27)$$

where:

Y(s) is the EMI source function at the quite port, utility side;

X(s) is the EMI source function at noisy port, the converter side;

X'(s) is the injected EMI noise function, after processing;

$K_1$ is the injector gain;

$K_2$ is the bits inversion algorithm implemented in the DSP device;

H(s) is the Laplace transform transfer function of the high-pass filter and is given by.

$$H(s) = \frac{s}{s + \omega_1} \quad (0.28)$$

where $\omega_1$ is equal to $$\frac{1}{RC} = 2 \cdot \pi \cdot f_1;$$

D(s) is the Laplace transform transfer function of the ZOH as derived in the previous section;

$$D(s) = \frac{1 - e^{-sT}}{sT} \quad (0.29)$$

where T is the ADC clock/sampling period;

G(s) is the Laplace transform transfer function of the RC low-pass filter, given by $$G(s) = \frac{1}{1 + s \cdot \omega_2} \quad (0.30)$$

Where, $\omega_2$ is equal to $$\frac{1}{RC} = 2\pi f_2.$$

This is corner frequency of the filter.

In theory, X'(s) should be equal in magnitude to the source function X(s), in order to achieve full nullification of the EMI noise. However, in practice this cannot be realized due to the parasitic capacitance inherent in the circuit. Therefore, Y(s)=X(s)−X'(s)≠0

Substituting H(s), D(s), and G(s) in (0.27), the closed-loop transfer function of the feedback diagram of FIG. 5 may be expressed as:

$$\frac{Y(s)}{X(s)} = \frac{(s+\omega_1)(s+\omega_2)}{s^2 + (\omega_1 + \omega_2)s + \left[\omega_1\omega_2 + \frac{K_1 K_2 \omega_2}{T}(1 - e^{-sT})\right]} \quad (0.31)$$

Figure 6:
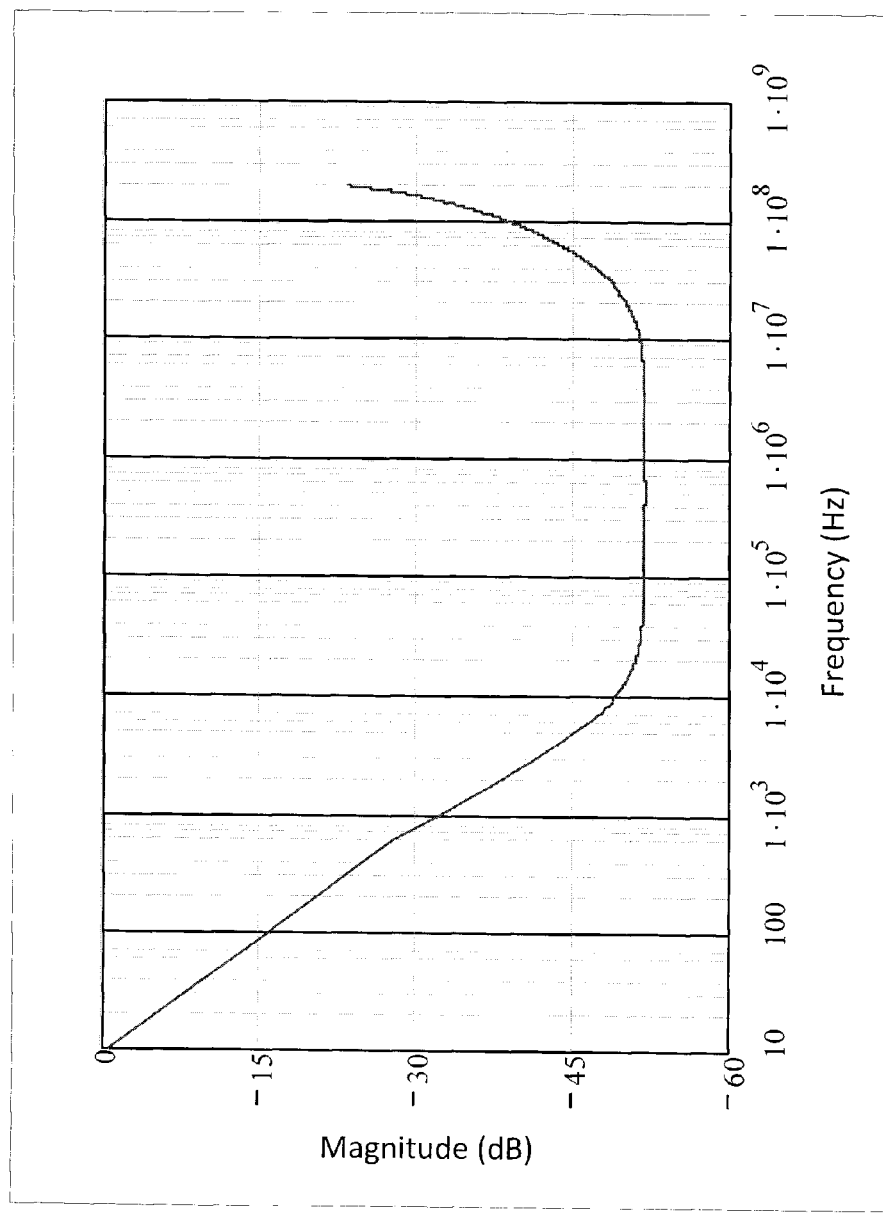
FIG. 6 is a plot showing the frequency response of magnitude a digital EMI filter according to one embodiment.
Figure 7:
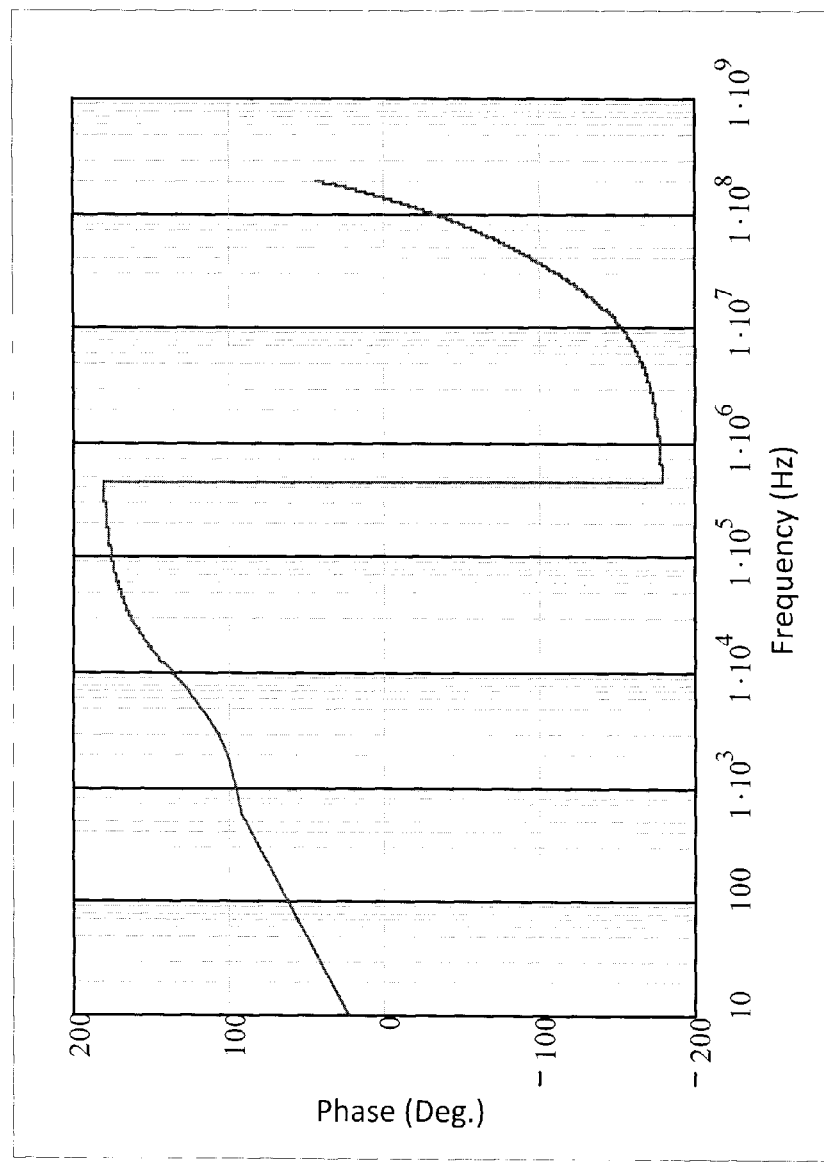
FIG. 7 is a plot showing the frequency response of phase of the a digital EMI filter according to one embodiment.

The frequency response of (0.31), in terms of magnitude and phase, is illustrated in FIGS. 6 and 7, respectively. For higher noise attenuation, the gain of the feedback transfer function of (0.31) should be as large as possible. This can be done by increasing the injector gain $K_1$. For example, to achieve an attenuation of at least 50 dB, a gain of 100 is required within the bandwidth of 10 KHz to 30 MHz.

FIGS. 6 and 7 show the frequency response of the magnitude and phase of a digital EMI filter according to one embodiment. In FIG. 7 the effect of the ZOH frequency properties on the overall attenuation transfer function is apparent. It is a shift of 180° where the sine function changes sign.

The invention is further described by way of the following non-limiting examples.

EXAMPLE 1

Simulation Results

Figure 8A:
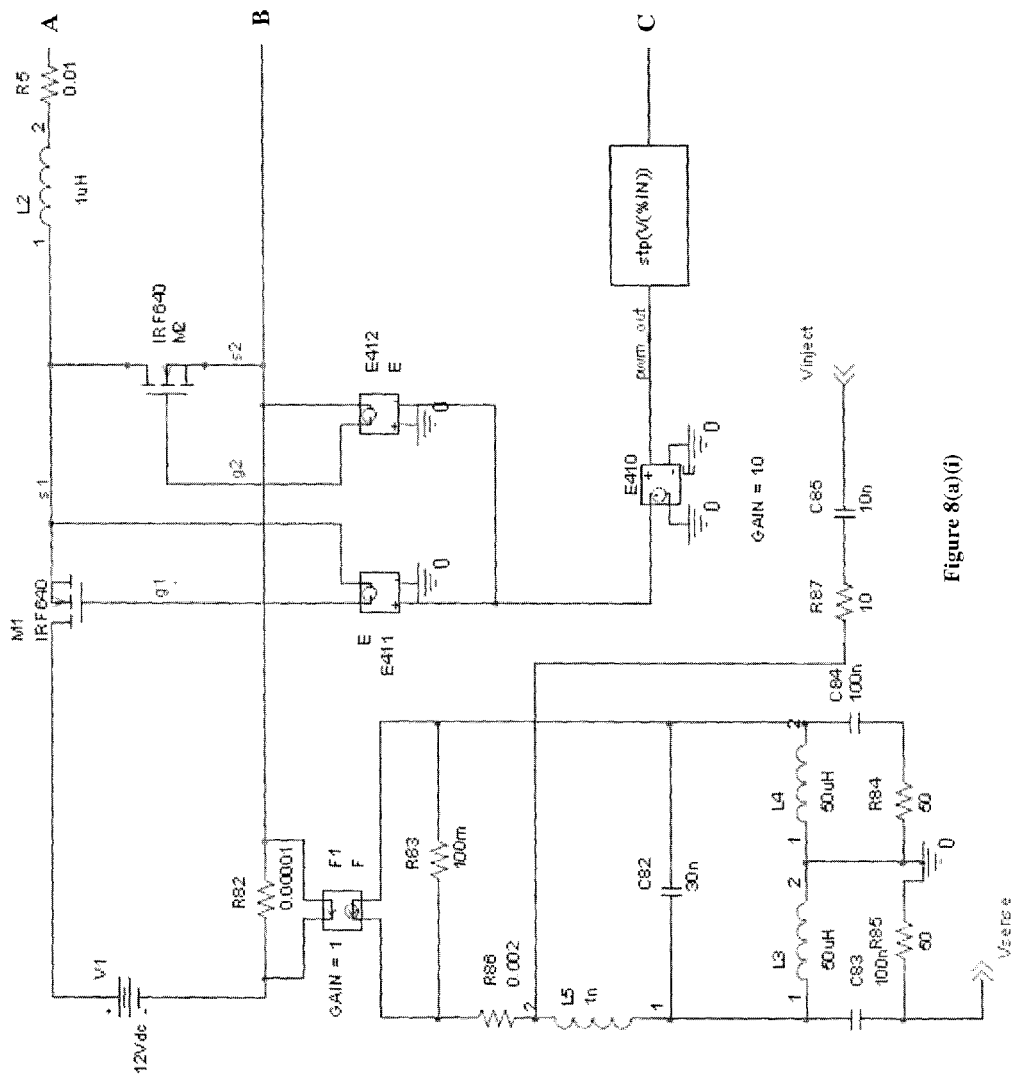
FIGS. 8(a)(i) and 8(a)(ii) and 8(b)(i) and 8(b)(ii) are schematic diagrams of a power converter circuit and digital active EMI filter, respectively, used in a simulation.
Figure 8B:
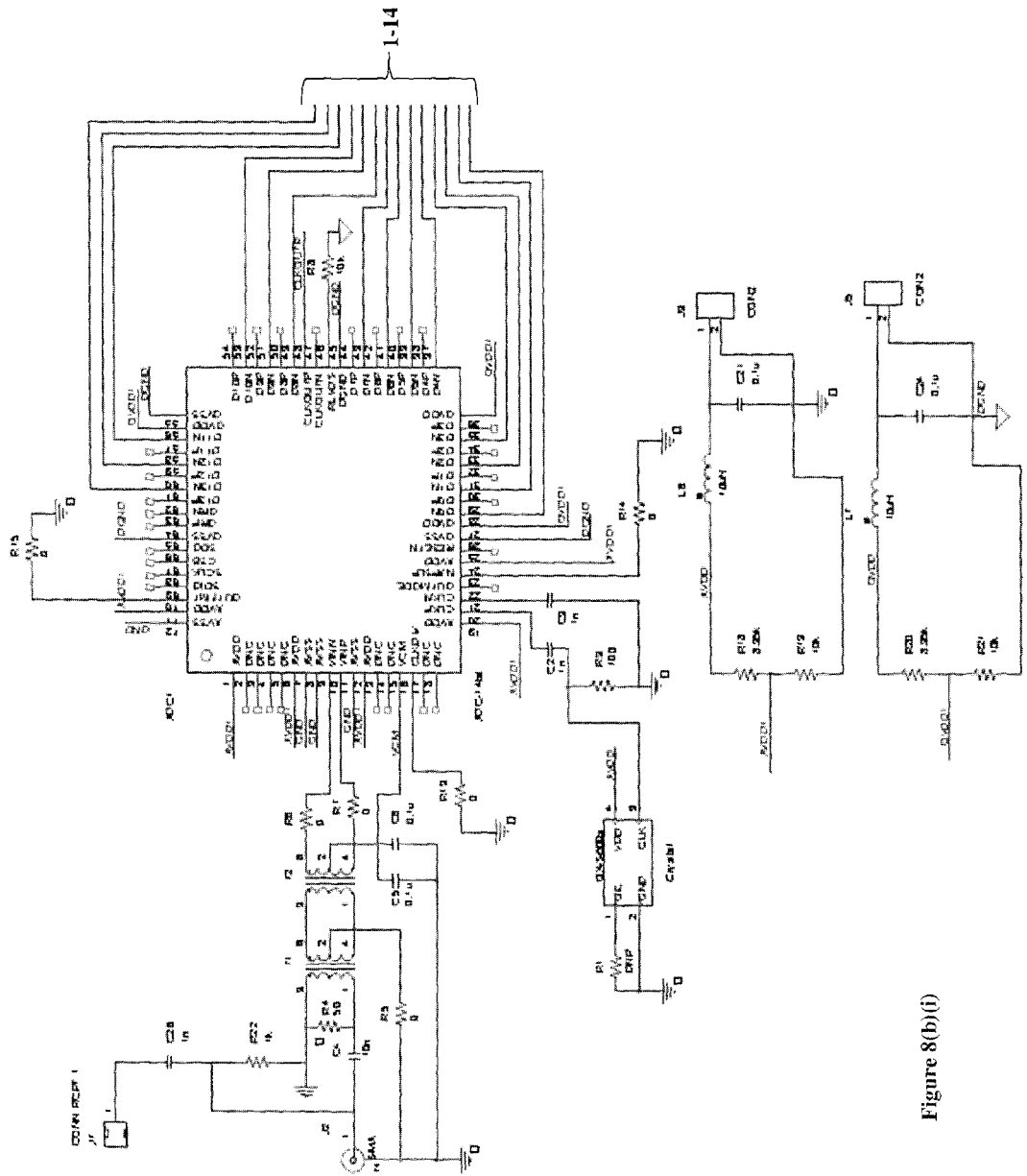

A DC/DC converter circuit was simulated in PSPICE™ version 16.3 (Cadence Design Systems, Inc., San Jose, Calif.) to investigate the contribution of the proposed EMI suppression technique. Simulations included a passive LC EMI filter or a digital EMI filter as described herein. The simulation was based on the circuit of FIG. 1(b), wherein a detailed schematic diagram of the simulated circuit is given in FIGS. 8(a)(i) and 8(a)(ii) and 8(b)(i) and 8(b)(ii). Most of the component models exist in the software library, except the line impedance stabilization network (LISN) which was modeled to represent a 50Ω utility source impedance. The primary (input) current signature was simulated by a current controlled current source (CCCS) which was connected through the LISN sense branch (RC high-pass filter) to generate the corresponding noise voltage.

A digital EMI filter circuit was constructed using existing library models for ADC and DAC devices. The resolution of these devices was selected to be 14 bits and the sampling frequency of the ADC was set at 200 Mbps which is about 10 times the upper frequency of the EMC standards for conducted emissions (30 MHz). In this case Shannon's theory for sampling (i.e., Shannon-Hartley Theorem) is not sufficient, considering the sensed signal amplitude and frequency variations. Thus, oversampling is required to achieve adequate and complete signal discretization.

Normally, for accurate comparisons between simulated and real plots, the simulation time should be adjusted in order to match the normalized filter bandwidth at −6 dB (200 Hz and 9 kHz) according to standard CISPR16-1 (Specification for Radio Disturbance and Immunity Measuring Apparatus and Methods—Part 1-1: Radio Disturbance and Immunity Measuring Apparatus—Measuring Apparatus). However, to simplify the various timing values and limit the number of simulated data points, 500 Hz and 10 kHz were used as analysis bandwidths. The converter parameters are given in Table 1.

The simulation was run in the transient analysis mode with the following profile parameters; stop-time 600 us, step-size 15 ns, and feedback transfer function gain of 30 dB.

First, the simulation was run without the EMI filter connected to the power converter. In another simulation run, the passive analog EMI filter was added to the converter circuit in order to observe the overall contribution in terms of input noise attenuation. In a third run, the digital EMI filter was added to the circuit, without the passive EMI filter. In all simulation runs, a Fast Fourier Transform (FFT) was performed on the sensed voltage at the LISN sense port to represent the noise voltage in terms of its harmonic content in the frequency domain and log compress the Y axis to represent the plots in dBuV, to be compared to compliance limits.

Figure 9A:
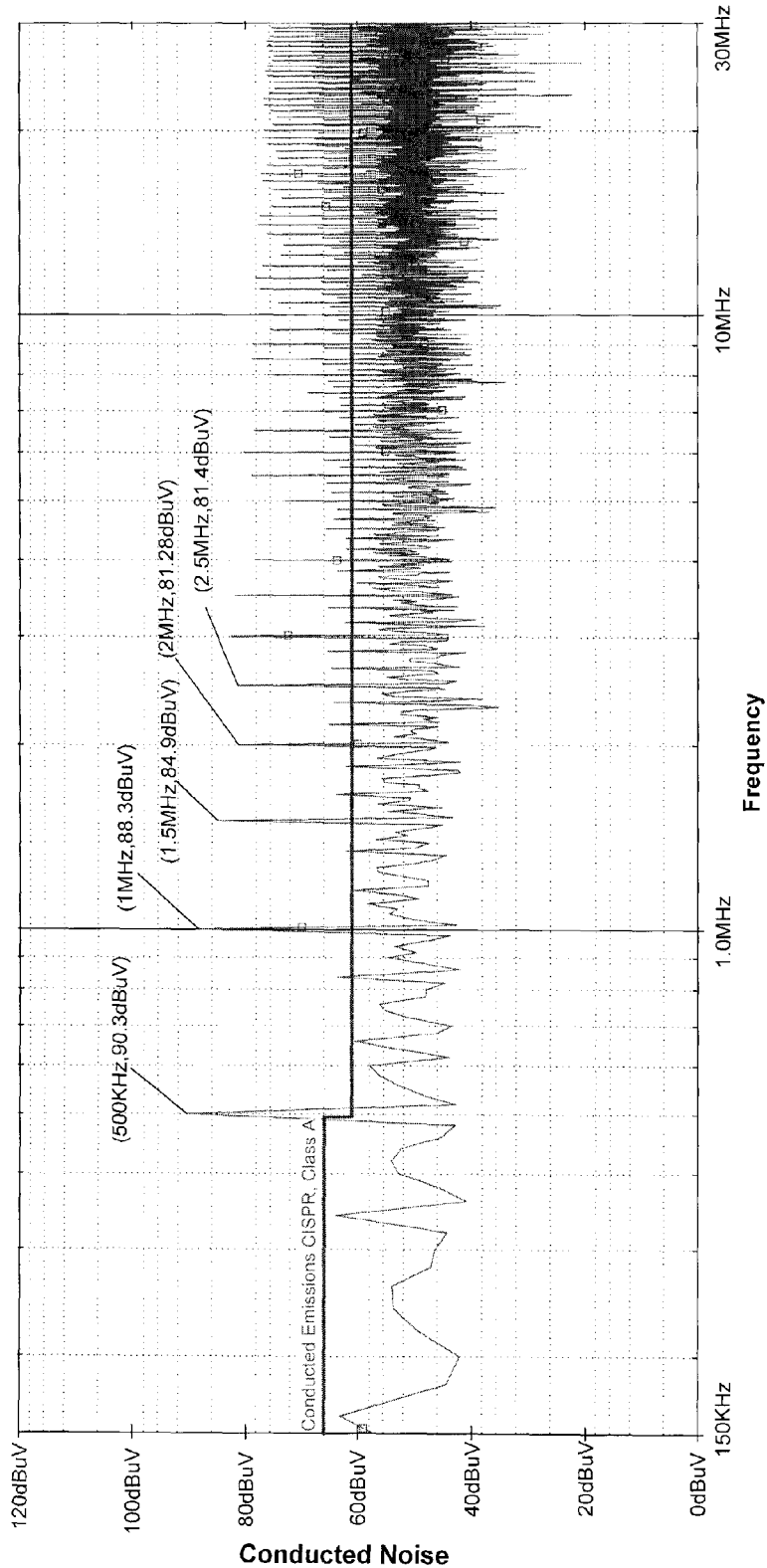
FIGS. 9(a) to (c) are plots showing simulation results of conducted noise measurement for the power converter of FIGS. 8(a)(i) and 8(a)(ii): (a) without an EMI filter; (b) with a passive EMI filter; and (c) with the digital EMI filter of FIGS. 8(b)(i) and 8(b)(ii)
Figure 9B:
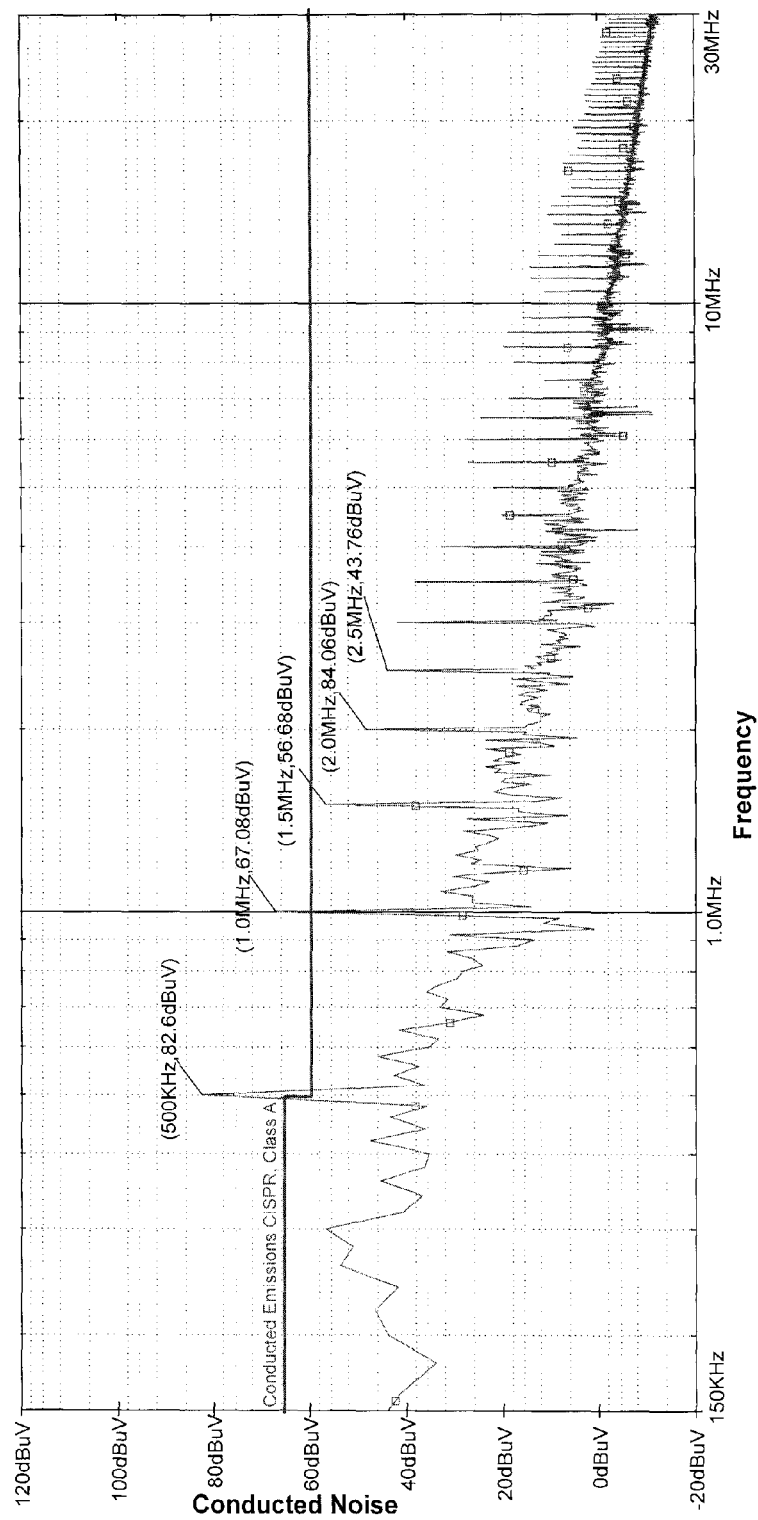
Figure 9C:
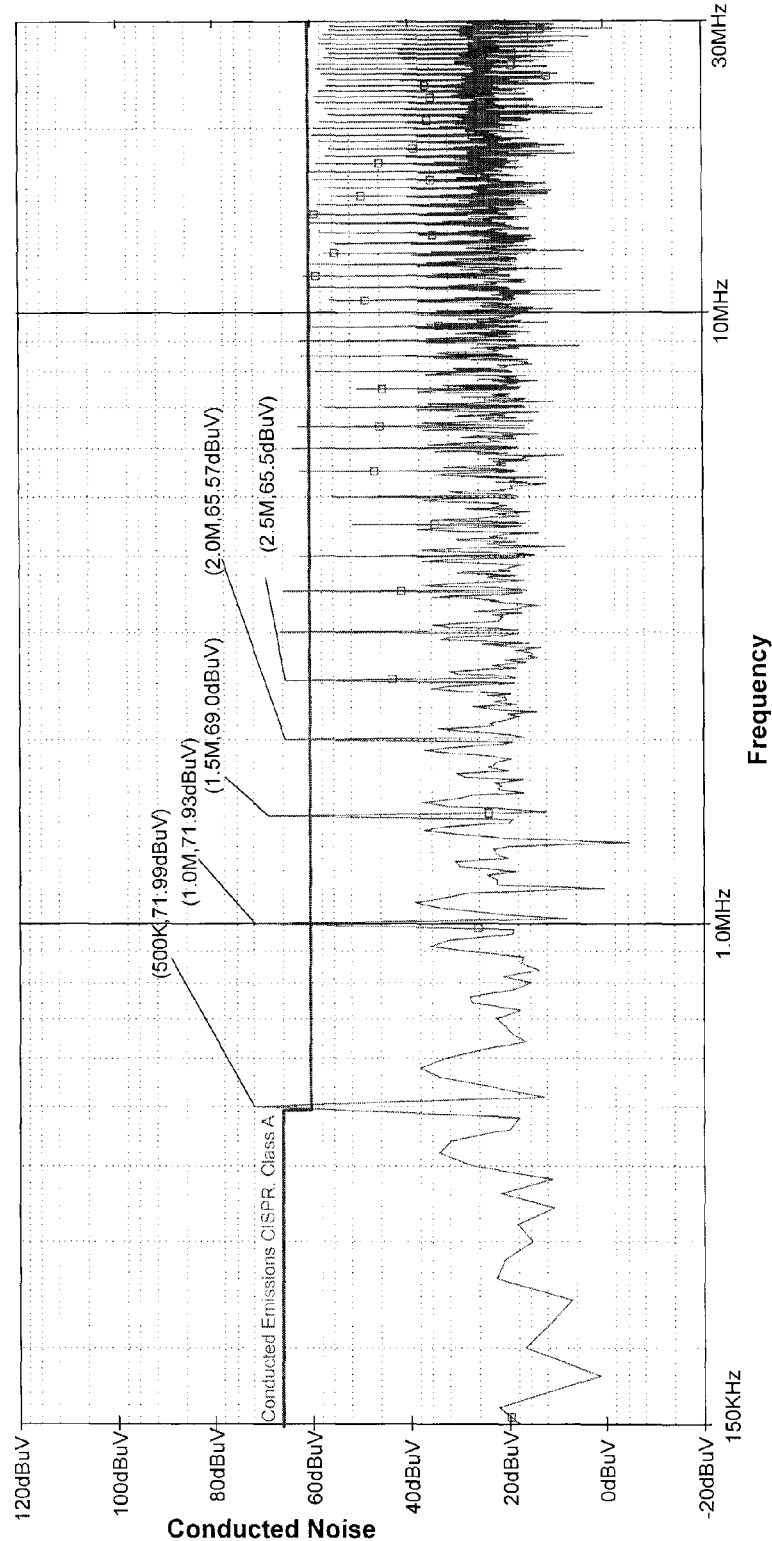
Figure 10:
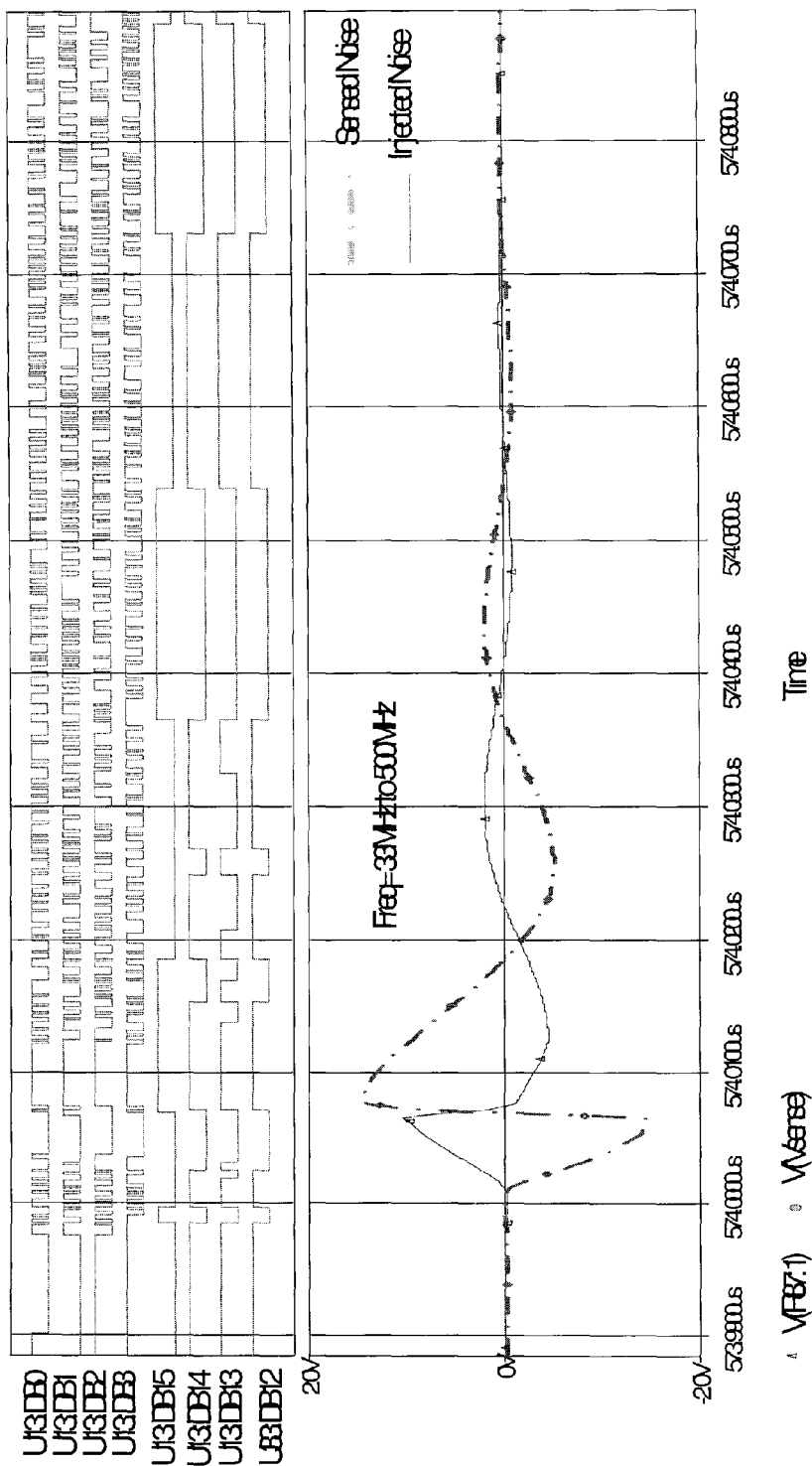
FIG. 10 is a plot of simulation results for the circuit of FIGS. 8(a)(i) and 8(a)(ii) with the digital EMI filter of FIGS. 8(b)(i) and 8(b)(ii), showing outputs of the analog-to digital converter and the digital-to-analog converter in the time domain.

Waveforms showing the simulated conducted EMI noise spectrum without an EMI filter, with the passive EMI filter, and with the digital EMI filter are shown in FIGS. 9(a), 9(b), and 9(c), respectively. As can be seen from these figures, EMI noise was attenuated by more than 20 dBuV when the digital EMI filter was introduced into the circuit. In particular, the digital EMI filter outperformed the passive EMI filter at the fundamental frequency (500 KHz) and the first several harmonic peaks. These peaks are labeled on the plots along with their corresponding frequencies. Binary plots of the most significant bit (MSB) and least significant bit (LSB) are shown in FIG. 10, as well as the noise signal at the output of the DAC and the sensed noise signal.

TABLE 1

Power Converter Parameters for Simulation

| Parameters | Values |
| --- | --- |
| Input voltage | 12 Vdc non-isolated |
| Output voltage | 5 Vdc |
| Output current | 4 A |
| Switches S1 & S2 | IRF640 |
| Switching Frequency | 500 KHz |
| Output filter | $L_{out}$ = 1 uH; $C_{out}$ = 100 uF |
| Input Passive filter components | $L_f$ = 1.5 mH; $C_f$ = 0.2 uF |
| Digital EMI filter components | 14 bits DAC, 14 bits ADC, RC low-pass filter 1 nF/30 Ω, RC high-pass filter 0.1 uF/1 KΩ |
| LISN components | 50 Ω/50 μH |

EXAMPLE 2

Preliminary Experimental Results

Figure 11A:
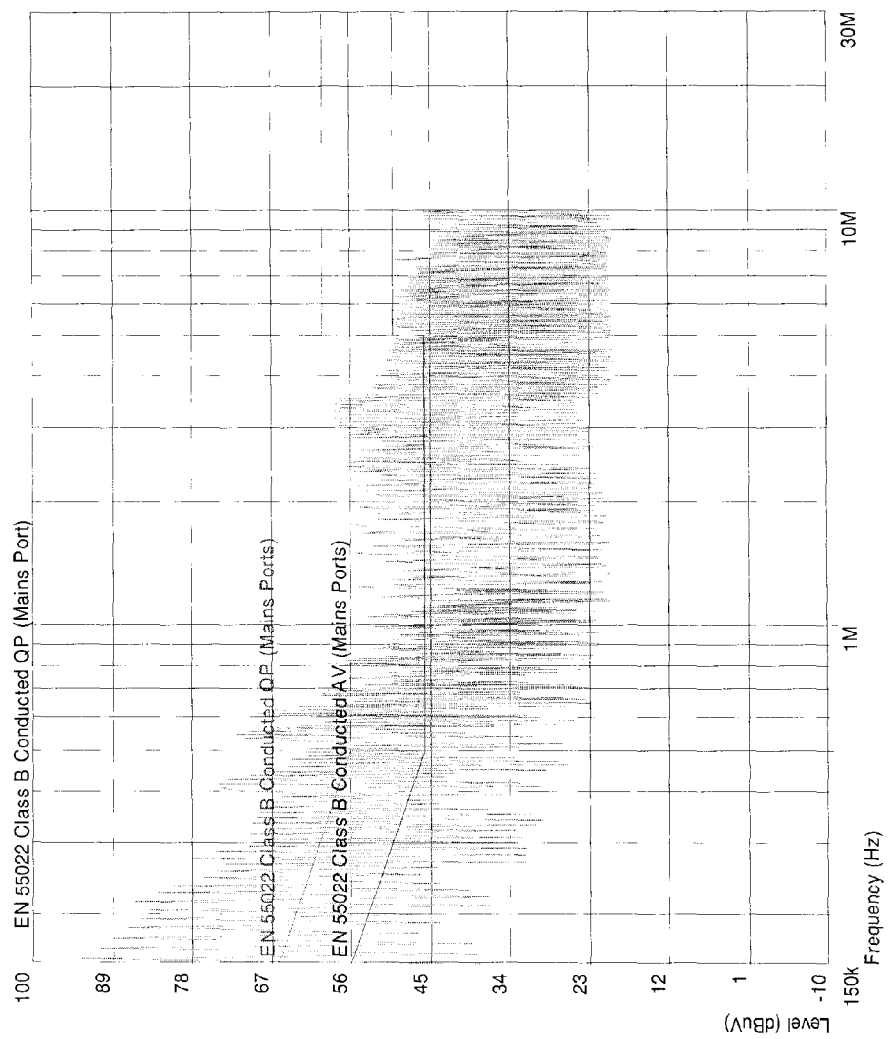
FIGS. 11(a) and (b) are plots showing results of a preliminary experiment using a 75 W AC/DC power supply adapter wherein conducted EMI was measured (a) with the passive filter provided with the AC/DC converter, and (b) with the passive filter replaced with a DSP-based active EMI filter as described herein.
Figure 11B:
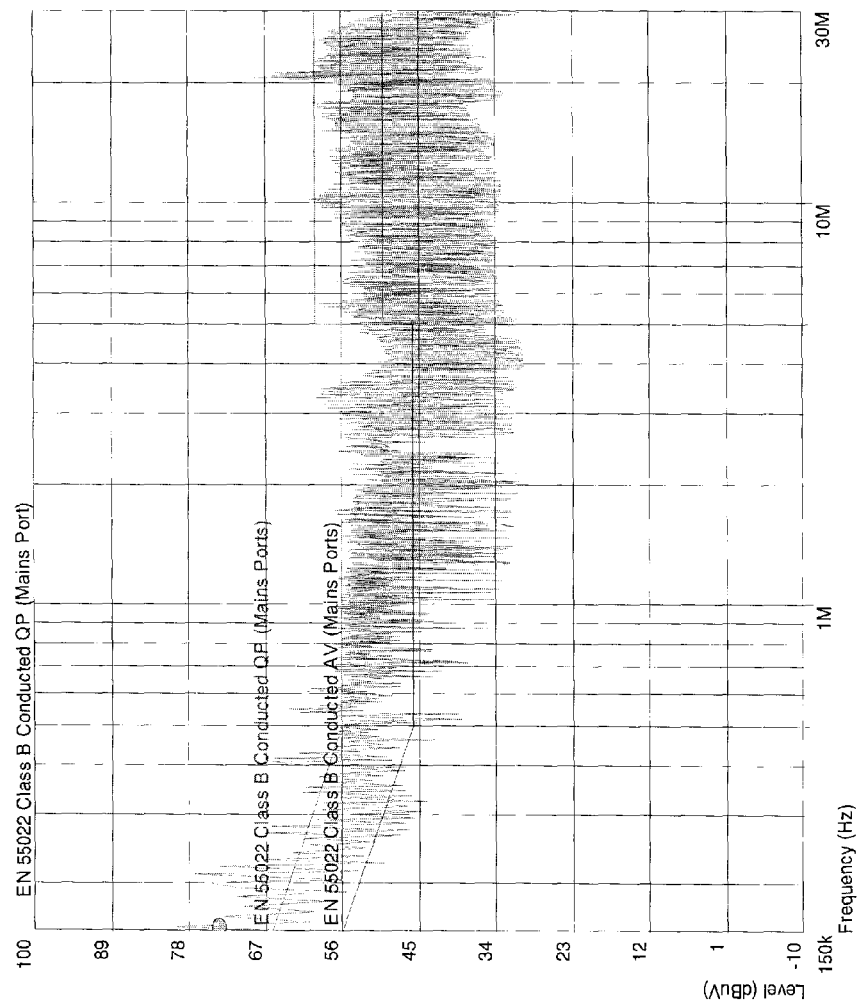

A 75 W AC/DC power supply adapter was used for this preliminary experiment. Measurements were performed according to standard CISPR22 (Information Technology Equipment—Radio Disturbance Characteristics—Limits and Methods of Measurement). First, conducted EMI was measured with the passive filter provided with the AC/DC converter. A second measurement was done by removing the passive filter from the converter and replacing it with a DSP-based active EMI filter as described herein. The results are plotted in FIG. 11(a) (passive filter) and FIG. 11(b) (digital active EMI filter).

The contents of all cited publications are incorporated herein by reference in their entirety.

While the invention has been described with respect to illustrative embodiments thereof, it will be understood that various changes may be made to the embodiments without departing from the scope of the invention. The described embodiments are to be considered merely exemplary and the invention is not to be limited thereby.

The invention claimed is:

1. A method for removing, minimizing, or reducing EMI noise generated by a power circuit, comprising:
   (i) combining at an input of the power circuit an EMI compensation signal with EMI noise generated by the power circuit to produce a combined signal; and
   (ii) sampling the combined signal and adjusting the EMI compensation signal;
      wherein sampling and adjusting comprises:
         producing a digital noise signal from the combined signal;
         processing the digital noise signal; and
         constructing an adjusted EMI compensation signal from the processed digital noise signal;
   (iii) repeating steps (i) and (ii) wherein combining is performed with the adjusted EMI compensation signal;
   wherein EMI noise at the input of the power circuit is removed, minimized, or reduced.

2. The method of claim 1, wherein sampling includes using a high pass filter and an analog to digital converter to produce the digital noise signal.

3. The method of claim 2, wherein processing includes inverting and providing gain to the digital noise signal.

4. The method of claim 3, wherein constructing includes using a digital to analog converter and a low pass filter to produce the EMI compensation signal.

5. The method of claim 4, wherein the high pass filter, gain, and low pass filter are selected to remove, minimize, or reduce EMI noise at the input of the power circuit.

6. The method of claim 4, including preventing high frequency components of the EMI noise from being sampled or conducted to an input power supply of the power circuit.

7. The method of claim 6, wherein preventing includes using an element having high impedance at high frequency at an input of the power circuit.

8. The method of claim 7, wherein the element having high impedance at high frequency is inserted between a sampling node and a node where the EMI compensation signal is combined with EMI noise generated by the power circuit.

9. The method of claim 7, including selecting a low pass filter transfer function that is complementary to a transfer function of the high impedance element.

10. The method of claim 1, wherein the power circuit is a power converter.

11. The method of claim 1, wherein at least one of sampling, processing, and constructing is implemented in a digital signal processor (DSP).

12. The method of claim 1, wherein at least one of sampling, processing, and constructing is implemented in a field programmable gate array (FPGA) or application specific integrated circuit (ASIC).

13. A digital EMI filter for a power circuit, comprising:
   means that combines at an input of the power circuit an EMI compensation signal with EMI noise generated by the power circuit to produce a combined signal; and
   means that samples the combined signal and adjusts the EMI compensation signal by producing a digital noise signal from the combined signal, processing the digital noise signal;
   and constructing an adjusted EMI compensation signal from the processed digital noise signal;

wherein the adjusted EMI compensation signal is subsequently combined with EMI noise generated by the power circuit, such that EMI noise at the input of the power circuit is removed, minimized, or reduced.

14. The filter of claim 13, wherein the means that samples the combined signal and adjusts the EMI compensation signal comprises:
a high pass filter and an analog to digital converter;
a processor; and
a low pass filter and a digital to analog converter.

15. The filter of claim 14, wherein the processor includes an inverter that inverts the digital noise signal.

16. The filter of claim 14, comprising an element having a high impedance at an EMI noise frequency, wherein the element is inserted between a sampling node and a node where the EMI compensation signal is combined with EMI noise generated by the power circuit.

17. The filter of claim 16, wherein the low pass filter has a transfer function that is complementary to a transfer function of the high impedance element.

18. The filter of claim 14, wherein at least one of the analog to digital converter, processor, and digital to analog converter is implemented in a field programmable gate array (FPGA) or application specific integrated circuit (ASIC).

19. The filter of claim 14, wherein at least one of the analog to digital converter, processor, and digital to analog converter is implemented in a digital signal processor (DSP).

20. The filter of claim 13, wherein the power circuit is a power converter.

21. A power circuit including the filter of claim 13.

22. A power converter including the filter of claim 13.

* * * * *